Patented Feb. 7, 1933

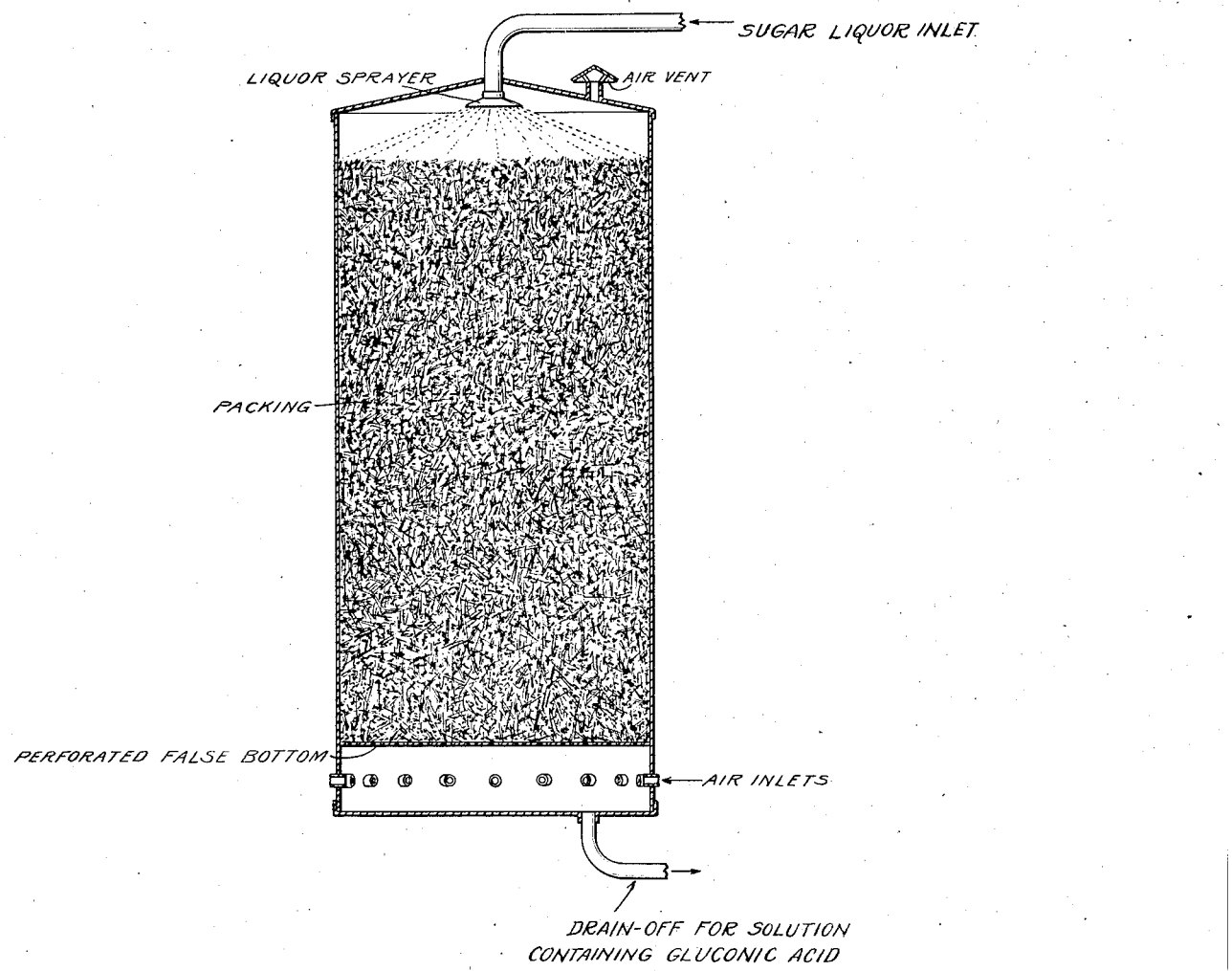

1,896,811

UNITED STATES PATENT OFFICE

JAMES N. CURRIE AND RALPH H. CARTER, BROOKLYN, NEW YORK, ASSIGNORS TO CHARLES PFIZER & COMPANY, OF BROOKLYN, NEW YORK, A CORPORATION OF NEW JERSEY

PRODUCTION OF GLUCONIC ACID

Application filed February 3, 1930. Serial No. 425,373.

This invention relates to the production of gluconic acid and salts of gluconic acid and, more particularly, to the production of gluconic acid by bacterial fermentation.

Heretofore, to our knowledge, gluconic acid has been produced by bacterial fermentation in a few isolated laboratory experiments but all efforts to employ bacterial fermentation for the commercial production of gluconic acid or salts thereof have been unsuccessful, the yield in all cases being far too low for commercial production and, in some cases, no gluconic acid being obtained at all.

An object of this invention is to provide a practical method of producing gluconic acid by bacterial fermentation whereby a high yield may be continuously obtained on a commercial scale in a short time.

According to this invention, gluconic acid is formed by fermenting a sugar liquor with gluconic acid forming bacteria from the acetobacter group in thin films and, specifically, this process is carried out by flowing the liquor in thin films through a tower or generator loosely packed with material so that the liquor can trickle through. The material is inoculated with gluconic acid forming bacteria from the acetobacter group, such as *Bacterium industrium, Bacterium oxydans, Bacterium acetosum, Bacterium acetigenum, Bacterium aceti, Bacterium xylinum,* and *Bacterium pasteurianum.*

As the sugar liquor, aqueous solutions containing a sugar giving gluconic acid such as d-glucose, maltose, or sucrose, or mashes containing such sugars, are used, to which may be added where desired a small amount (about 0.2% to 2%) of a nutrient material, as yeast cell, barley sprouts, etc. A 20% sugar solution is preferred, but concentrations ranging from 1–45% may be used. As the concentration increases above 15% a neutralizing agent such as the carbonate or hydroxide of calcium, barium, magnesium, sodium, or potassium is desirable to be added, to neutralize or partly neutralize the gluconic acid as formed.

The conversion of the sugar to gluconic acid is a simple oxidation and may be represented by the following equation:

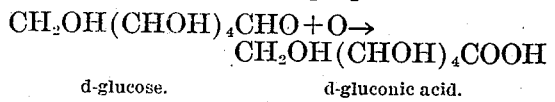

$$CH_2OH(CHOH)_4CHO + O \rightarrow$$
$$CH_2OH(CHOH)_4COOH$$

d-glucose.    d-gluconic acid.

One method of operating this process may be briefly described with reference to the accompanying drawing in which a vertical section of a simple tower or generator designed for this purpose is shown more or less diagrammatically.

The sugar liquor is fed to a suitable liquor distributor at the top of the generator where it is uniformly distributed onto a packing substantially filling the generator and resting on a false bottom perforated to allow the solution containing gluconic acid to drain through to the real bottom of the generator. The first liquor may be inoculated with the culture, which establishes itself throughout the packing. The packing may be material such as wood shavings or sticks, coke, or clay shards. As the liquor trickles down through the packing, a current of air is directed upwardly through the packing, thereby thoroughly aerating same and spreading the liquor out into thin films on the surface of the packing The sugar in passing down through the packing is converted to gluconic acid which passes through the false bottom and is collected in the real bottom provided with drain off to remove same.

The conversion will proceed satisfactorily at temperatures from 15–35° C., the preferred temperature being about 25° C.

As long as a culture of acetobacter is maintained in the generator without contamination, the conversion can be carried out indefinitely. A yield of four pounds of gluconic acid per cubic foot of packing space per 24 hour day can be obtained where the porous material has been loosely filled into the generator.

In carrying out the process, a generator of sufficient height to completely convert the sugar during a single passage may be used, or a shorter generator may be used and the liquor recirculated with or without recovering the solution containing gluconic acid already formed, and with or without adding fresh liquor, until complete conversion of the sugar is effected, or several generators may be connected in series and the liquor passed through one after the other to effect complete conversion.

The rate at which the liquor may be passed through a generator varies greatly, depending on the concentration of the liquor, height of the generator, and the percent of conversion desired.

The invention claimed is:

1. Process for the production of gluconic acid comprising fermenting a sugar liquor in the form of thin films in contact with air with gluconic acid forming bacteria from the acetobacter group.

2. Process for the production of gluconic acid comprising fermenting a sugar liquor in the form of thin films in contact with air with gluconic acid forming bacteria from the acetobacter group at a temperature of 15° to 35° C.

3. Process for the production of gluconic acid comprising fermenting in the form of thin films in contact with air a 1 to 45% sugar solution containing a small amount of a nutrient material with gluconic acid forming bacteria from the acetobacter group.

4. Process for the production of gluconic acid comprising fermenting in the form of thin films in contact with air an approximately 20% d-glucose solution containing a small amount of a nutrient with gluconic acid forming bacteria from the acetobacter group at a temperature of 15° to 35° C.

5. Process for the production of gluconic acid comprising passing a sugar liquor in the form of thin films in contact with air over material inoculated with gluconic acid producing bacteria from the acetobacter group.

6. Process for the production of gluconic acid comprising passing at a temperature of 15° to 35° C. a sugar liquor in the form of thin films in contact with air over an inert porous material inoculated with gluconic acid producing bacteria from the acetobacter group.

7. Process for the production of gluconic acid comprising passing in the form of thin films in contact with air a 1 to 45% sugar solution containing a small amount of a nutrient material over an inert porous material inoculated with gluconic acid forming bacteria from the acetobacter group.

8. Process for the production of gluconic acid comprising passing in the form of thin films in contact with air and at a temperature of 15° to 35° C. an approximately 20% d-glucose solution containing a small amount of a nutrient material over an inert porous material inoculated with gluconic acid forming bacteria from the acetobacter group.

9. Process for the production of gluconic acid comprising passing a sugar liquor downwardly through a surface extending body of material inoculated with gluconic acid forming bacteria from the acetobacter group whereby to spread said liquor in a thin film on the surface of said material and at the same time passing a current of air upwardly through said body.

10. Process for the production of gluconic acid comprising distributing a sugar liquor onto a surface extending body of material inoculated with gluconic acid forming bacteria from the acetobacter group whereby to spread said liquor in a thin film on the surface of said material and at the same time passing a current of air upwardly through said body.

11. Process for the production of a salt of gluconic acid comprising fermenting in the form of thin films in contact with air a sugar liquor containing a neutralizing agent with gluconic acid forming bacteria from the acetobacter group.

12. Process for the production of a salt of gluconic acid comprising fermenting in the form of thin films in contact with air a sugar liquor containing a neutralizing agent selected from the group consisting of the carbonates and hydroxides of calcium, barium, magnesium, sodium, and potassium, with gluconic acid forming bacteria.

13. Process for the production of gluconic acid and a salt of gluconic acid comprising fermenting in the form of thin films in contact with air a sugar liquor containing a neutralizing agent with gluconic acid forming bacteria from the acetobacter group.

Signed at Brooklyn, in the county of Kings and State of New York, this 31st day of January, A. D. 1930.

JAMES N. CURRIE.
RALPH H. CARTER.